United States Patent
Price

[15] 3,666,920
[45] May 30, 1972

[54] BASE CONTAINING AN ELECTRIC HEATER ELEMENT AND AN AUTOMATIC TEMPERATURE CONTROL FOR SUPPORTING GLASS OR CERAMIC COOKWARE

[72] Inventor: David B. Price, Mansfield, Ohio
[73] Assignee: Westinghouse Electric Corporation, Pittsburgh, Pa.
[22] Filed: Jan. 26, 1971
[21] Appl. No.: 109,829

[52] U.S. Cl..............................219/449, 99/331, 219/435, 219/467, 219/533
[51] Int. Cl. ......................................................H05b 3/68
[58] Field of Search..................219/448, 449, 450, 452, 461, 219/432–436, 467, 533; 99/331, 333, 412

[56] References Cited

UNITED STATES PATENTS

| | | | |
|---|---|---|---|
| 2,888,548 | 5/1959 | Knapp | 219/435 |
| 2,927,189 | 3/1960 | Purpura | 99/333 X |
| 3,201,567 | 8/1965 | Hanson | 219/450 |
| 3,221,123 | 11/1965 | Huffman | 219/450 X |
| 3,231,718 | 1/1966 | Vasile | 219/449 X |
| 3,508,485 | 4/1970 | Munsey | 99/331 |

Primary Examiner—Volodymyr Y. Mayewsky
Attorney—F. H. Henson, E. C. Arenz and Winans, Fred A.

[57] ABSTRACT

A base containing an electric heater element and controls for supporting glass or ceramic cookware and providing automatic temperature control. The control includes a bi-metal controlled switch enclosed in a metal housing having one surface, generally adjacent the bottom of the cookware, treated so as to be highly absorptive of infrared radiation incident thereon. The bi-metal then reacts in response to the amount of radiation absorbed on that surface which is directly related to the temperature of the cookware. Other surfaces of the housing are also similarly treated to aid dissipation of the heat in the control and minimize lag time between the temperature of the dish and the temperature of the controls.

11 Claims, 4 Drawing Figures

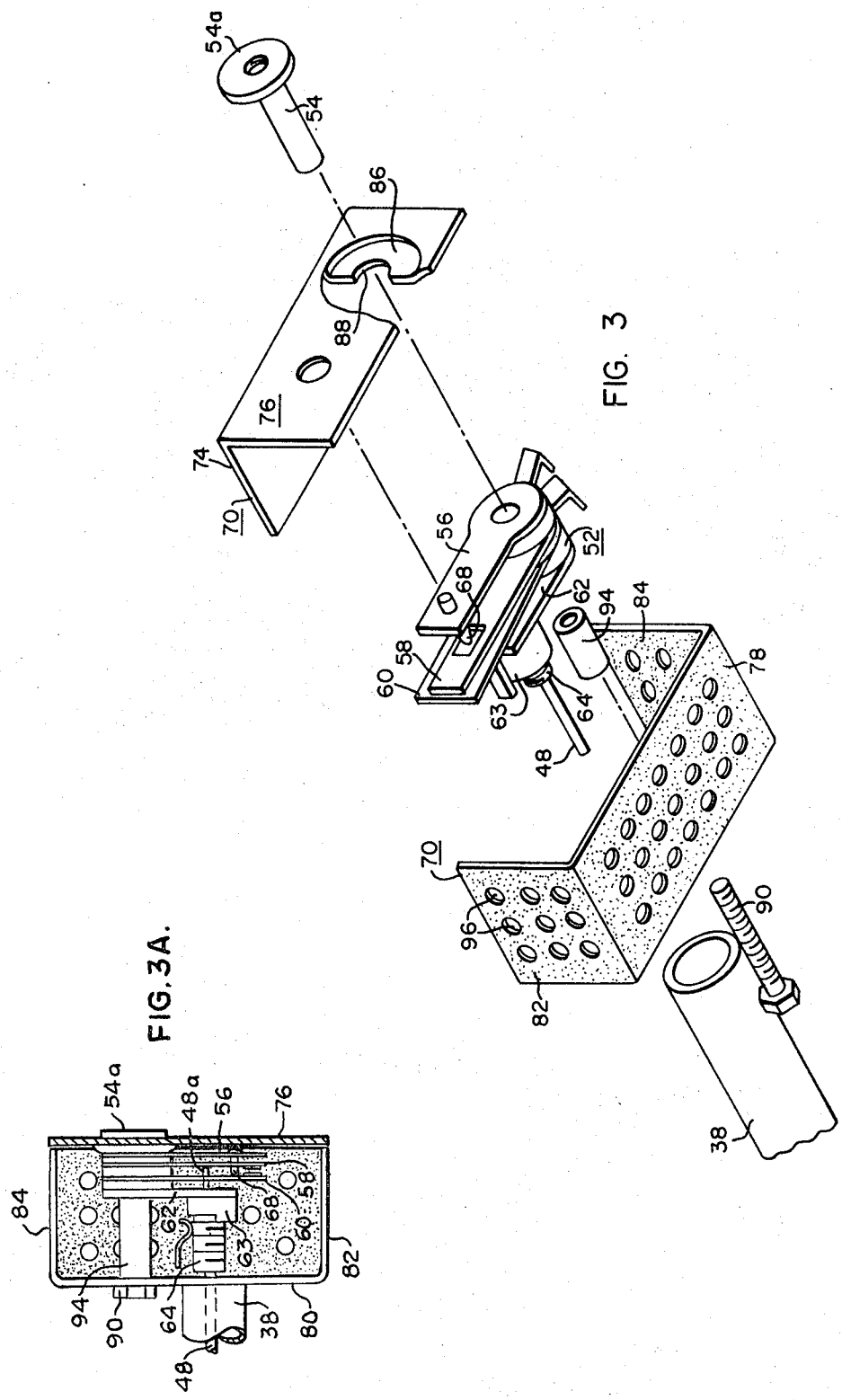

3,666,920

BASE CONTAINING AN ELECTRIC HEATER ELEMENT AND AN AUTOMATIC TEMPERATURE CONTROL FOR SUPPORTING GLASS OR CERAMIC COOKWARE

BACKGROUND OF THE INVENTION

1. Field of the Invention

This invention relates generally to a base containing an electric heating element and a temperature responsive control element for automatic control of cookware supported on the base.

More specifically the invention relates to such a base for automatically controlling the temperature of glass or ceramic type cookware.

2. Description of the Prior Art

Combining non-electrified cookware with a base having an automatically controlled heater to obtain the advantages of both automatic control plus separability of the electrical unit and the dish containing the food has long been recognized. Such units generally comprised a base containing a heater and a temperature sensing element that controlled the energization of the heater to maintain the dish or pan supported thereon at the desired temperature.

The temperature sensing elements generally were in conductive heat transfer relationship with some portion of the pan when supported on the base to transmit the pan temperature to a bi-metal controlled switch. Such a device is shown in U.S. Pat. No. 2,888,458.

This arrangement, however, was limited to dishes or pans fabricated from relatively efficient heat conductors such as metals for the reason that such a pan would have a relatively even distribution of heat throughout its cooking area and even with a sensing element in contact with a portion thereof, which would, in effect, drain the heat therefrom to the bi-metal, the surrounding heat was readily conducted to that point of contact to make up for the heat lost.

However, the above type temperature sensing devices would not work satisfactorily on pans or dishes having poor lateral heat conductive characteristics such as dishes fabricated from glass or ceramic. This was because a temperature sensing surface placed in contact with the dish would drain the heat from the dish at the area of contact faster than the heat in the surrounding area could flow back into sensed area. Because of this the bi-metal would not be subjected to the actual cooking temperature.

Also, as the bi-metal control was positioned in generally the heater area, after energization of the heater the control was always subjected to relatively high ambient temperatures. If the heat sensing surface of the control were kept at a temperature greater than ambient the control would respond to the temperature of the sensing surface. However, if, after the heat were drained from the dish at the sensing surface, the ambient temperature was then greater than the sensing surface, the ambient temperature then became the dominant controlling temperature. This temperature was also not dependent upon the food temperature in the dish and therefore would not provide accurate control.

The present invention provides a heat sensing surface adjacent the bottom of the dish which relies mainly on absorbing radiant thermal energy from the dish and transmitting this absorbed heat to the bi-metal.

This has the advantage of not draining any heat from only a localized area of the dish as the dish bottom is always radiating infrared rays in proportion to its temperature.

Further, the system previously referred to as being satisfactory when used with a metal pan did not truly respond to the food temperature but to the pan temperature. Fortunately, there is sufficient relationship between the two that the cooking could be adequately controlled in this manner; however, it is evident that being responsive to the food would provide a more accurate control.

Because of the poor lateral conduction of the ceramic or glass dish, the part of the dish immediately above the temperature sensing surface of the present invention is heated primarily through the food contained in the dish. Thus the temperature of the dish at this area more directly reflects the temperature of the food, than the temperature of a metal dish reflects the temperature of food, and the control of the present invention is considered to be superior.

These and other advantages of the present invention will be more apparent from the following description of preferred embodiment in conjunction with the drawings.

SUMMARY OF THE INVENTION

The invention is generally embodied in a base containing an electric heater and a temperature responsive means for controlling the energization of the heater to maintain a manually preset temperature in glass or ceramic cookware supported on the base. The temperature responsive means includes a bi-metal controlled switch enclosed in a housing having a surface adjacent the cookware bottom. The surface is treated with an emissivity coating to provide a highly efficient absorber of infrared radiation and the bi-metal is in conductive relationship to this surface so that it is responsive to the radiation absorbed. Since the radiation absorbed is proportional to the temperature of the cookware. The temperature of the cookware can be automatically controlled through the bi-metal. Other surfaces of the housing act as radiators to dissipate heat from the bi-metal and reduce the time lag generally associated with automatic temperature responsive controls.

DRAWING DESCRIPTION

FIG. 3 is an exploded enlarged view of the switch and adjacent housing of the invention; and FIG. 3A is a top plan view of the bimetal switch.

DESCRIPTION OF THE PREFERRED EMBODIMENT

Figure 1:
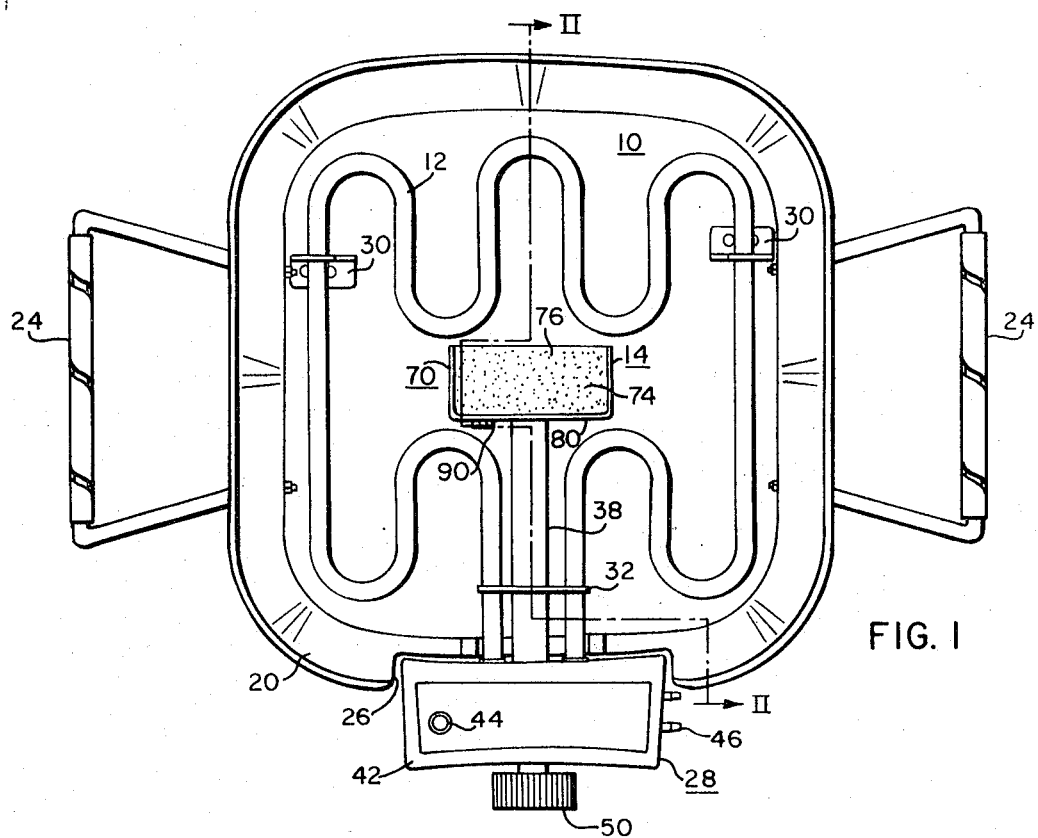
FIG. 1 is a top view of the base of the invention.

Referring now to the accompanying drawings, the preferred embodiment of the invention generally comprises a base 10 for supporting the cookware (shown in phantom in FIG. 2) thereabove and serving as a receptacle for the heater element 12 and temperature control means 14. As such, the base 10 can be of any desired shape to conform to the dish to be supported and generally comprises a bottom 16 having an upstanding peripheral wall 18 which terminates in an outwardly contoured peripheral flange 20 on which the dish rests in a generally nested relationship. The base 10 has legs 22 for supporting it in spaced relation on a counter or table top and opposed handle means 24.

One side of the flange 20 and wall 18 are notched as at 26 to facilitate removability of the heater 12 and attached control means 14 which extend from the interior of the base 10 to an exteriorly accessible connector 28 for manual adjustment.

The base 10, as above described, including the wall 18 and flange 20, is preferably an integral piece formed, such as by stamping or casting, from a metal, preferably aluminum, providing a generally reflective surface.

The heater element 12 comprises a well known sheathed electrical resistance heater formed in a generally serpentine configuration to more evenly distribute the heat over the bottom of the dish supported on the base and is itself removably supported in spaced relation to the base on two support elements 30 attached to the bottom 16 and collar 32 receiving the heating element and a conduit tube 38 extending from the connector 28 to the control means 14. The collar 32 has a depending tongue portion 40 extending through an aperture 41 in the base and removably retained therein by a spring clip means (not shown) on the underside of the base.

The connector 28 comprises a housing 42 preferably of molded plastic for receiving the terminals of the heater element 12 and the necessary wiring to connect them through the control means 14, which itself has wires extending through conduit tube 38 to the housing 42, and through a neon light 44 to male prongs 46 extending exteriorly of the housing for receiving a well known electric cord having a mating female plug. The housing also supports one end of a control rod 48 which extends through the conduit tube 38 to the control means 14. A knob 50 is attached to the rod 38 exteriorly of the housing 42 for manual adjustment of the control means as will be explained later and has appropriate indicia thereon to indicate the setting.

Figure 2:
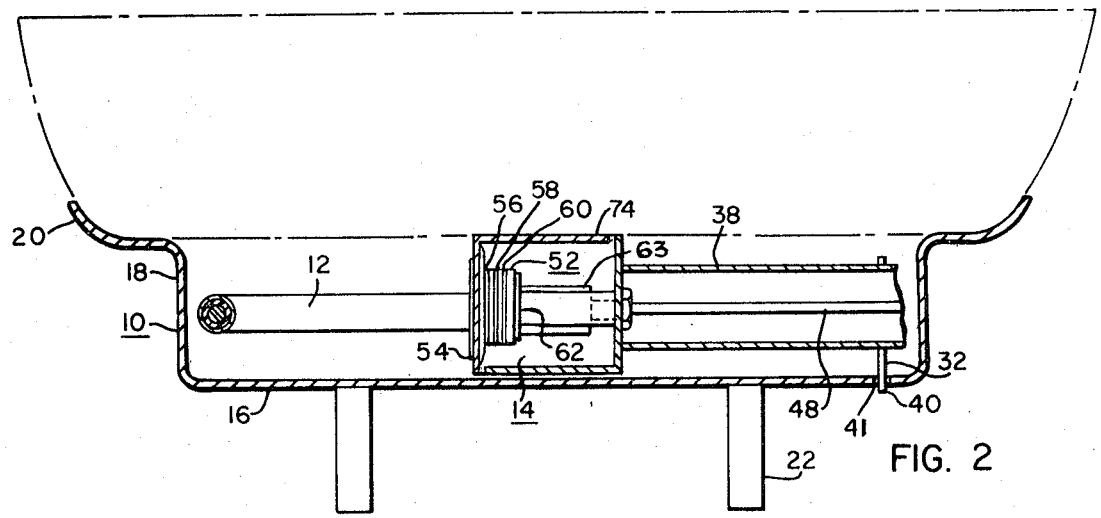
FIG. 2 is a sectional view along lines II—II of FIG. 1.

The temperature control means 14 is generally centrally located in the base as shown in FIGS. 1 and 2 and with specific reference to FIGS. 2, 3 and 3A comprises a well known stacked bi-metal controlled switch 52 generally having a headed sleeve 54 supporting a bi-metal arm 56, two normally closed spring biased contact arms 58 and 60 and associated terminals and a support arm 62 all being mounted on the sleeve and separated by insulating washers. Support arm 62 has a threaded nipple 63 which receives a mating threaded head 64 on the control rod 48 having a plunger 48a abutting one arm 58 for adjustable displacement of it from the other contact arm 60 by turning knob 50 on control rod 48. A plunger 68 on the free end of the bi-metal 56 is disposed adjacent the other contact arm 60 for abutting it to an open position. Thus the amount of movement of the bi-metal to cause the contact arms 58 and 60 to open is dependent upon their relative setting as determined by the control plunger 48a. The heater terminals are connected through the terminals of the contact arms 58 and 60 as is well known in the art so the heater is energized in response to the bi-metal control switch 52.

The bi-metal control switch 52 is housed in a generally perforated box-like enclosure 70 of heat conductive material such as aluminum, solidly attached, as by welding, to the end of the interior conduit tube 38 which opens into it through an aperture for receiving wires from the contact terminals (not shown) and the control rod 48.

The enclosure 70 generally comprises, for ease of assembly and other reasons noted later, two separate components with the first component in this instance including the top wall 74 and one side wall 76 of the box, and the other component including the bottom wall 78, an opposing side wall 80 to which the conduit tube 38 is attached, and two opposing end walls 82 and 84.

Side wall 76 has an indentation 86 with a centrally located aperture 88 so that the headed portion 54a of sleeve 54 is received in the indentation 86 with the sleeve then extending through the aperture for receiving the bi-metal arm 56 and associated stacked components of the switch 52 as previously described. It is to be noted that the bi-metal arm 56 is in intimate heat conductive relationship with the interior surface of the indentation. The interior of the headed sleeve 54 is threaded to receive a screw 90 extending through an aligned aperture in side wall 80 for attaching the two separate components together into a unitary member. A spacer sleeve 94 is positioned between the bi-metal control switch 52 and side wall 80 to maintain them in proper spatial relationship against the tension of the tightened screw 90. Another important feature that should be noted is that the two separate components of the enclosure 70 are maintained separated from each other (see FIGS. 1, 2 and 3A) so as not to permit the conductance of heat between them except for the small amount which may be transferred through the single screw attachment.

The outer surface of the top wall 74 along with both the inner and outer surfaces of the bottom wall 78 and contiguous side wall 80 and end wall 82 and 84 are surface treated so as to be highly absorptive of infrared radiation incident thereon from the surrounding relatively high temperature surfaces. Such a surface treatment includes anodizing the appropriate surfaces of the aluminum enclosure but in this instance the surfaces are preferably treated by being coated with an emissivity coating such as "Sicon Black" manufactured by the Dexter Corporation, Midland Division, Waukegan, Illinois. This provides an emissivity of approximately 0.95 which remains generally constant throughout the appropriate range of operating temperatures of the heater.

As, for all practical purposes, the emissivity and absorptivity of a body in this temperature range is the same, this coating also provides a highly efficient radiating surface. (For amplification of the relationship between absorptivity and emissivity and the relative values of specific coatings, see Heat and Mass Transfer E. R. G. Eckert, Second Edition of Introduction To The Transfer Of Heat And Mass, 1959 pp. 359 et seq.

Accordingly both the inner and outer surfaces of side wall 76 on which the bi-metal arm 56 is mounted along with the inner surface of the top wall 74 remain untreated and uncoated so as to retain the relatively high reflectivity of the aluminum. It is also seen that the end walls 82 and 84, side wall 80 and bottom wall 78 of the enclosure 70 contain a plurality of apertures 76. The purpose of the separate components, the coated surfaces and the apertures will be appreciated in the following description of operation of the invention.

The enclosure 70 is supported by the conduit tube 38 so as to be spaced a short distance above the bottom 16 of the base 10 as seen in FIG. 2 with the top wall 74 positioned so as to abut the bottom of the dish placed on the base or be spaced therefrom only a very short distance such as 0.125 inches, or less.

DESCRIPTION OF THE OPERATION

A dish containing the foodstuff to be cooked is placed on the base 10 and the control knob so set to the desired temperature. This energizes the heater which heats the bottom of the dish both from direct and reflected infrared radiation. The heat is conducted through the dish to the foodstuff therein.

The heated dish bottom itself provides infrared radiation in an amount proportional to the fourth power of its absolute temperature. (Stefan-Boltzmann Law). Also, since the dish material inherently has a relatively high emissivity factor (probably on the order of 0.90 or greater) whereby the dish absorbs most of the radiant energy incident thereon, essentially all radiation emanating from the bottom is due to its own temperature and is not reflected radiation.

The density of the thermal radiation received on the top wall 74 of enclosure 70 is inversely proportional to the square of the distance it is from the source of radiation. (Because the bottom of the dish in not ground perfectly flat and the top wall 74 is not perfectly flat, there always exists some distance the radiation has to travel between the two surfaces). For this reason it is seen that, for greatest sensitivity it should be abutting the bottom; however, it has been found to be able to maintain sufficient sensitivity even when displaced a short distance therefrom. The surface treatment of wall 74 with the emissivity coating provides that essentially all of the thermal radiation incident thereon is absorbed.

Top wall 74 and side wall 76 being in intimate heat conductive relationship allow the thermal energy absorbed by the top wall to be transmitted to the bi-metal arm 56 mounted in intimate contact, as previously described, on wall 76 thus in effect making the bi-metal directly responsive to the temperature of the dish bottom.

In this respect there are two important features of the top wall 74 and connected side wall 76. First, the outer surface of the side wall 76 and the headed portion 54a of sleave 54 are generally in close proximity to the heater element 12; however, as these surfaces are not treated and are thus highly reflective, most of the thermal radiation they receive is reflected and therefore the heat sensed by the bi-metal arm 56 is primarily that transferred to it from top wall 74. Secondly, also the interior surfaces of the top wall 74 and side wall 76 remain uncoated thus making this component a relatively poor radiator so that the heat energy absorbed by the top wall is generally retained, and not radiated away before it is transmitted to the bi-metal 56.

It is essential in such a control that there is no significant time lag after the heater has been cut out by the bi-metal, between the time the dish temperature has cooled to a point where more heat should be applied and the time the bi-metal has cooled so as to sense this temperature. Treating the remaining walls 78, 80, 82 and 84, both exteriorly and interiorly, with the emissivity coating and providing the apertures therein as previously described accomplish this function by increasing the ability of this portion of the housing to absorb the thermal radiation generated by the relatively warm surfaces associated with the bi-metal and radiate it to other surfaces outside the housing and by permitting convection currents to pass through the housing and cool the bi-metal and associated components.

As these exteriorly coated walls 78, 80, 82 and 84 are generally adjacent the heater, during the energization thereof they readily absorb the heat; however, as they are only connected to the wall 76 through the screw 90, their temperature has little effect on the bi-metal actuation with respect to the amount of heat received through the main absorptive surface 74 and only predominate as heat dissipating means during the heater off portion of the cooking cycle.

For practical purposes final consideration should be given to the dimensions of the top wall 74 in that it should not be too large to prevent a very large area of the bottom of the dish from being blocked to receiving infrared radiation and yet it should be large enough to provide a sufficient heat source to actuate the bi-metal in response to the temperature of a representative area of the dish. In this regard it has been found a surface in the order of two inches by seven-eighths inches functions satisfactorily.

I claim:

1. A cooking appliance for supporting and automatically controlling the temperature of a glass or ceramic cooking dish comprising:
   a base including a reflective surface and means for supporting said dish above said reflective surface;
   heater means disposed within said base and spaced below said supporting means to provide a space between said heater and the underside of said dish;
   means for automatically controlling the heater means in response to the temperature of said dish;
   said control means including a manually adjustable temperature-responsive switch means for controlling the energization of said heater means and a housing for shielding said switch means from said heater means;
   said housing comprising at least a first part and a second part generally in non-conductive heat relationship to each other;
   said first part including at least a top wall having an outer surface highly absorptive to radiant thermal energy in the cooking temperature range and conductive means for transmitting the thermal energy absorbed by said outer surface to said temperature responsive switch means; and
   said second part including means cooperating with said first part to enclose said temperature responsive switch means within said housing.

2. An appliance according to claim 1 wherein said housing is fabricated of a generally heat conductive metal and said outer surface of said top wall is treated so as to have an emissivity factor of at least 0.95 for thermal radiation in the cooking temperature range.

3. An appliance according to claim 2 wherein said conductive means is fabricated of a heat conductive metal and wherein its surface is generally reflective so that the heat therein is not radiated therefrom, thereby maintaining a minimum heat loss in transmitting the thermal energy to said temperature responsive switch means.

4. An appliance according to claim 3 wherein said second part of said housing has inner surfaces and outer surfaces with all said surfaces treated similar to said top surface of said first part.

5. An appliance according to claim 4 wherein said treated surfaces are covered by an emissivity coating.

6. An appliance according to claim 5 wherein said emissivity coating comprises Sicon Black. outer 7. An appliance according to claim 6 wherein said housing is generally disposed within said base with said outer surface of said top wall generally adjacent the bottom surface of said cooking dish supported thereon.

8. A cooking appliance for supporting and automatically controlling the temperature of a glass or ceramic cooking dish comprising:
   a base including a bottom portion and means for supporting said dish above said bottom portion;
   heater means disposed within said base and spaced below said supporting means to provide a space between said heater and the underside of said dish;
   means for automatically controlling the heater means in response to the temperature of said dish;
   said control means including a manually adjustable temperature-responsive switch including a bi-metal arm for controlling the energization of said heater means and a housing for shielding said switch means from said heater means;
   said housing comprising at least a first part and a second part generally in non-conductive heat relationship to each other;
   said first part comprising a generally planar horizontal top wall and a generally vertical depending wall in conductive heat relationship;
   said second part comprising an opposing bottom wall generally adjacent the bottom of the pan and substantially vertical wall means which cooperates with the respective walls of said first part to enclose said switch;
   said bimetal arm of said switch being mounted on said vertical wall of said first part interiorly of said housing and in intimate conductive heat transfer relationship thereto; and
   said top wall having an outer surface treated to be generally highly absorptive to radiant thermal energy in the cooking temperature range;
   said treated surface of said housing disposed within said base to be generally adjacent the bottom surface of said dish;
   whereby radiant heat energy generated by said dish and incident upon said top wall is absorbed by said wall and transferred to said bi-metal to control said switch.

9. A cooking appliance according to claim 8 wherein said first and second parts of said housing are fabricated from heat conductive metal and the inner surfaces of said top wall and both inner and outer surfaces of said depending wall of said first part are generally reflective to thermal radiation.

10. A cooking appliance according to claim 9 wherein the inner and outer surfaces of said walls of said second part are treated similar to said top surface of said first part.

11. An appliance according to claim 10 wherein said treated walls comprise an emissivity coating thereon to provide an emissivity factor of at least 0.95.

* * * * *